US011082513B2

(12) United States Patent
Feng et al.

(10) Patent No.: US 11,082,513 B2
(45) Date of Patent: *Aug. 3, 2021

(54) UNIFIED END USER NOTIFICATION PLATFORM

(71) Applicant: VERIZON MEDIA INC., New York, NY (US)

(72) Inventors: Andrew Feng, Cupertino, CA (US); N. Nachiappan, Bangalore (IN); Bruno M. Fernandez-Ruiz, Sevenoaks (GB); Lin Shen, Haidian (CN)

(73) Assignee: VERIZON MEDIA INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,871

(22) Filed: May 23, 2018

(65) Prior Publication Data

US 2018/0270317 A1 Sep. 20, 2018

Related U.S. Application Data

(63) Continuation of application No. 14/024,020, filed on Sep. 11, 2013, now Pat. No. 9,998,556.

(51) Int. Cl.
*H04L 29/08* (2006.01)
*H04L 29/06* (2006.01)

(52) U.S. Cl.
CPC ............ *H04L 67/26* (2013.01); *H04L 63/102* (2013.01)

(58) Field of Classification Search
CPC ........... H04M 2207/18; H04M 3/5322; H04M 3/42229; H04M 3/53366; H04W 92/02; H04L 63/102; H04Q 2213/13093; H04Q 2213/13098
See application file for complete search history.

(56) References Cited

U.S. PATENT DOCUMENTS

| 8,856,807 | B1 * | 10/2014 | Khapre ................. G06Q 10/10 719/318 |
| 8,868,447 | B1 * | 10/2014 | Terrell, II .............. G06Q 30/02 705/14.73 |
| 9,118,614 | B1 * | 8/2015 | Rogers ................... H04L 51/36 |
| 2002/0137500 | A1 | 9/2002 | Brooking et al. |
| 2003/0093485 | A1 | 5/2003 | Dougall et al. |
| 2003/0208549 | A1 | 11/2003 | El-Shimi et al. |
| 2004/0002972 | A1 * | 1/2004 | Pather .................... G06F 9/542 |
| 2004/0068481 | A1 | 4/2004 | Seshadri et al. |
| 2005/0031096 | A1 | 2/2005 | Postrel |

(Continued)

*Primary Examiner* — Ninos Donabed

(74) *Attorney, Agent, or Firm* — James J. DeCarlo; Greenberg Traurig, LLP

(57) ABSTRACT

A unified end-user notification platform delivers event alerts to different types of clients including mobile devices and HTTP clients. Users can subscribe to a plurality of notification channels and select from the associated various delivery options via a single user interface. The events are received by the unified notification platform which matches the received events with the user subscription data to identify subscribers and their respective delivery options. Corresponding event alerts are generated and delivered based on the user or subscriber specified options. Multiple event alerts corresponding to public and private data notification channels are provided to a user device via a single connection.

16 Claims, 12 Drawing Sheets

(56) References Cited

U.S. PATENT DOCUMENTS

| | | | |
|---|---|---|---|
| 2010/0131385 A1 | 5/2010 | Harrang et al. | |
| 2010/0299140 A1 | 5/2010 | Witbrock et al. | |
| 2011/0040895 A1 | 2/2011 | Griffin et al. | |
| 2011/0246614 A1* | 10/2011 | Votaw | G06Q 40/02 709/219 |
| 2011/0247082 A1* | 10/2011 | Buchhop | G06Q 40/02 726/28 |
| 2012/0179742 A1* | 7/2012 | Acharya | H04N 7/18 709/202 |
| 2012/0198002 A1 | 8/2012 | Goulart et al. | |
| 2012/0239541 A1* | 9/2012 | Tsukahara | G06Q 40/02 705/35 |
| 2012/0311046 A1 | 12/2012 | Grigoriev | |
| 2013/0035086 A1* | 2/2013 | Chardon | H04N 21/00 455/420 |
| 2013/0083203 A1 | 4/2013 | Barrett et al. | |
| 2013/0247094 A1* | 9/2013 | Hardin | H04N 21/2385 725/33 |
| 2014/0032694 A1* | 1/2014 | Cohn | G06F 11/3072 709/207 |
| 2014/0123157 A1 | 5/2014 | Keskitalo et al. | |
| 2014/0129661 A1* | 5/2014 | Thyagaraja | H04L 51/24 709/207 |
| 2014/0189592 A1* | 7/2014 | Benchenaa | G06F 3/04886 715/835 |
| 2014/0344721 A1* | 11/2014 | Prakash | H04M 1/274508 715/753 |

\* cited by examiner

Alerts Creation and Management

My Alerts

Select types from the list below.

| AMBER/Missing Children | Keyword News |
| Breaking News | Local News NEW! |
| Daily News | Sports |
| Fantasy Sports | Stocks Summary |
| Feed / Blog | Stocks Watch |
| Health News | Travel Destinations |
| Horoscope | Weather |

Blog or feed? Add a Yahoo! Alerts button to your site!

| Symbol | Price falls to | Price rises to | Percent Decrease | Percent Increase |
|---|---|---|---|---|
| TWX | | 21 | | |
| VPACX | 12 | | | |
| ^GSPC | 1250 | | | |

Add more symbols

Deliver to:
☑ Email ✉
☑ Yahoo! Messenger ☺  ▷ johndoe@yahoo.com
☐ Mobile 📱  ▷ johndoe
Add a mobile device Keywords News
Enter keywords to the right.
Use quotes to search for entire phrases. Separate words with spaces. Example: "Federal Reserve"

View a Sample Email Alert

Include: [_____]
You will receive articles containing EVERY word in the "Include" field.

Do not Include: [_____]
You will not receive articles containing ANY word in the "Do not Include" field.

Choose how often you want Alerts delivered
○ As they happen
⊙ Once daily

| TYPE | ALERT NAME | STATUS ✉ ☺ 📱 | EDIT | DEL |
|---|---|---|---|---|
| Stocks Watch | VPACX, ^GSPC, TWX | ON ☑ ☑ ☐ | ✏ | 🗑 |
| Travel Destinations | Shanghai | ON ☑ ☐ ☐ | ✏ | 🗑 |

Turn All Alerts on | off

FIG. 2

UNIFIED END USER NOTIFICATION PLATFORM

CROSS REFERENCES TO RELATED APPLICATIONS

This application is a continuation of and claims priority from co-pending U.S. patent application Ser. No. 14/024,020, filed on Sep. 11, 2013, entitled "UNIFIED END USER NOTIFICATION PLATFORM," the entirety of which is incorporated herein by reference.

BACKGROUND

The advances in wireless Internet technologies and mobile computing lead to the booming of many services that serve data such as stock alerts, weather updates or personal communications including emails or instant messages to the millions of users via various devices. User preferences can be collected and the data can be served based on each user's individual preferences. The data for different categories can be formatted differently and may be delivered to the user via different applications executing on the user device. While HTTP clients display data via a browser, mobile devices such as smartphones can employ native "Apps" that execute on the operating systems such as iOS, Android or Windows Phone to display the data to the users.

SUMMARY

This disclosure relates to systems and methods for providing a unified end-user notification platform capable of delivering different types of information associated with public and/or private notification services to each of the millions of users based on each user's individual preferences. A processor-implemented method for providing the notifications is disclosed in accordance with one embodiment. The method comprises, providing a user interface that enables a user subscription to at least one notification channel providing public data and at least one notification channel providing private data and receiving user selected options for receipt of event alerts or messages from the notification channels. In an embodiment, each of the at least two notification channels has a service quality that is disparate from the other notification channel. For example, the public notification channel can be a best effort delivery service and the private notification channel is can be guaranteed delivery service. In an embodiment, the process comprises receiving, by the processor, a request from the client device for the event alerts and storing the request from the client device without response until at least one of the event alerts is generated.

An event is received from each of the notification channels and at least one user that subscribed to the notification channels is identified by matching user subscription data with the received events. At least two event alerts such that each event alert corresponding to a respective one of the events are generated in accordance with respective user selection options for the at least two notification channels. The event alerts are published to respective channels and are transmitted to a client device associated with the at least one user via a single connection. In an embodiment the event alerts further comprise selecting, by the processor, a user agent for transmitting the event alerts and pushing the event alerts to the client device via the selected user agent.

In an embodiment, the event alerts are generated based on rules that define parameters for generating the event alerts. In an embodiment, a plurality of subscription requests are received, from a plurality of users for notifications associated with the at least two notifications channels so that the user interface is provided to the plurality of users for subscribing to the at least two notification channels. In an embodiment, the process of transmitting the event alert associated with the notification channel providing public data further comprises creating a first channel to deliver the event alert associated with the notification channel providing public data to the plurality of users and creating one or more respective second channels to deliver the event alert associated with the private notification channel to each recipient of the plurality of users.

A computing device comprising a processor and a storage medium for tangibly storing thereon program logic for execution by the processor is disclosed in an embodiment. In an embodiment, the program logic comprises user interface providing logic for providing a user interface that enables a user to subscribe to at least one notification channel providing public data and at least one notification channel providing private data, user options receiving logic for receiving user selected options for receiving messages from the notification channels and event receiving logic for receiving an event from each of the notification channels. User identifying logic, is executed by the processor, for identifying at least one user that subscribed to the notification channels and at least two event alerts respectively corresponding to one of the events are generated in accordance with respective user selection options by the alert generating logic and alert transmitting logic is executed by the processor for transmitting the at least two event alerts to a client device associated with the at least one user via a single connection.

In an embodiment, the alert transmitting logic further comprises channel identifying logic for identifying respective channels for the event alerts, alerts publishing logic for publishing the event alerts to the channels, user agent selecting logic for selecting a user agent for transmitting the event alerts and pushing logic for pushing the event alerts to the client device via the selected user agent. In an embodiment, the program logic further comprises receiving logic, executed by the processor, for receiving a plurality of subscription requests from a plurality of users for notifications associated with the at least two notifications channels such that the user interface providing logic provides the user interface to the plurality of users for subscribing to the at least two notification channels.

A computer readable storage medium comprising processor-executable instructions is disclosed in an embodiment. The instructions when executed by the processor cause the processor to provide a user interface that enables a user subscription to at least one notification channel providing public data and at least one notification channel providing private data and receive user selected options for receiving messages from the notification channels. The instructions further cause the processor to receive, an event from each of the notification channels, identify at least one user that subscribed to the notification channels, generate at least two event alerts, each event alert corresponding to a respective one of the events such that each of the event alerts is generated in accordance with respective user selection options for the at least two notification channels and transmit the at least two event alerts to a client device associated with the at least one user via a single connection. Therefore, only one connection for each user device is used for all event alerts independent of the number of subscriptions or alerts.

In an embodiment, the instructions for transmitting the event alerts to the user further comprise instructions that cause the processor to identify respective channels for the event alerts and publish the event alerts to the channels. The instructions further cause the processor to select a user agent for transmitting the event alerts and push the event alerts to the client device via the selected user agent. In an embodiment a plurality of subscription requests are received from a plurality of users for notifications associated with the at least two notifications channels and the user interface is provided to the plurality of users for subscribing to the at least two notification channels. In an embodiment, instructions for transmitting the at least two event alerts further comprise instructions that cause the processor to create a first channel to deliver to the plurality of users, the event alert associated with the notification channel providing public data and create respective second channels to deliver the event alert associated with the private notification channel to each recipient.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views:

FIG. 2 is a schematic diagram of a unified user interface that facilitates alerts creation and management by the users of the unified notification module in accordance with one embodiment;

DESCRIPTION OF EMBODIMENTS

Figure 1:
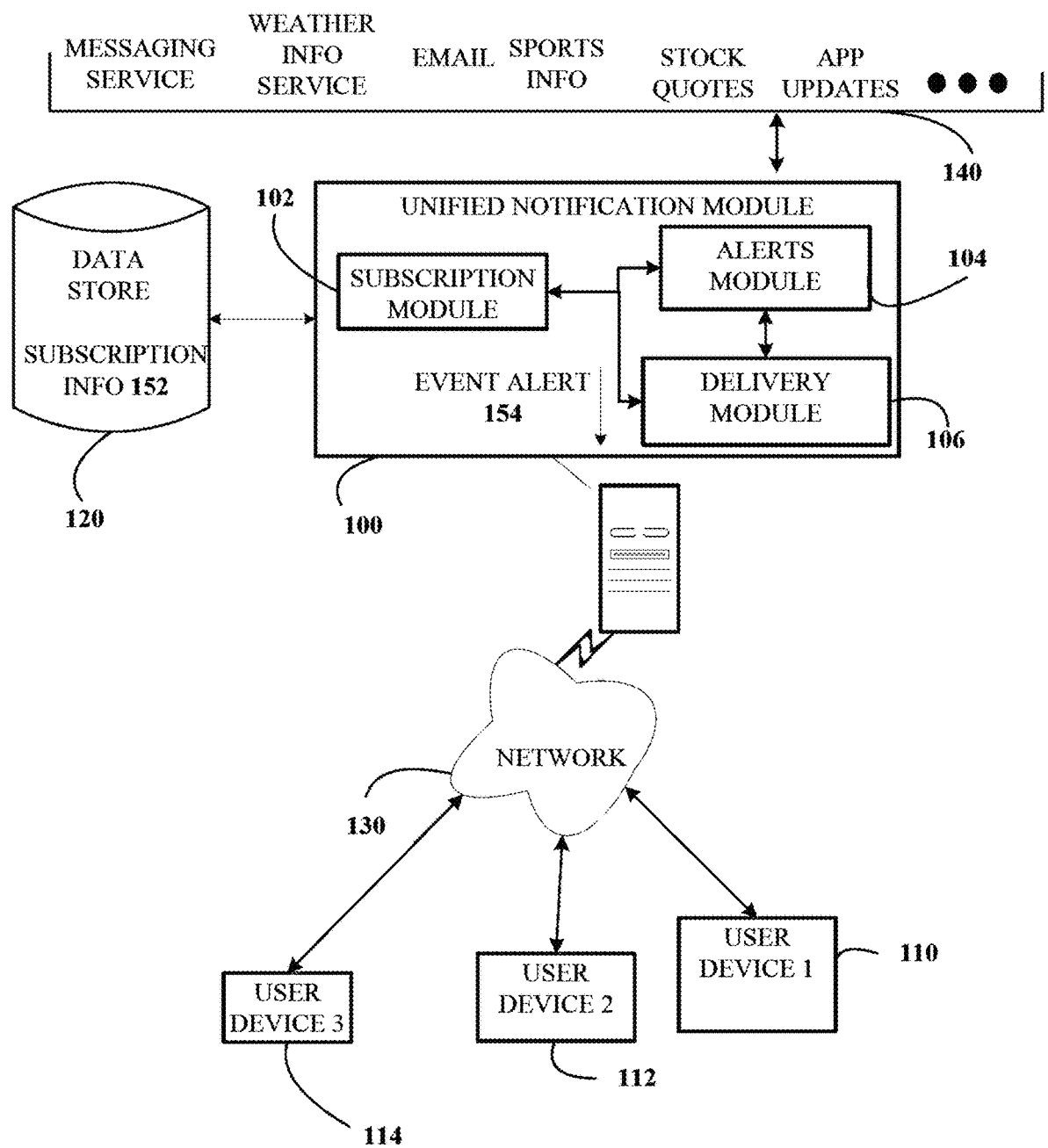
FIG. 1 illustrates a unified notification module that provides information from various services to users in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various applications currently exist that provide information and entertainment to users through different communication networks including the Internet, cables or cellular networks. For example, various point solutions exist for disseminating public data via mobile apps such as for newspapers providing breaking news, financial data, weather updates. Alert channels can also provide such public data via emails or instant messages. Similarly, various modalities/devices exist for conveying private information such as emails, instant messages or SMS communications. Each of these channels can have a special user interface (UI) for users to specify their subscription interests and implements match through a set of ad-hoc SQL (Structured Query Language) tables and statements. Data for these different applications can be configured according to standardized or proprietary formats. In addition, different data retrieval procedures can be implemented by the different systems. For example, data that is changing within short time periods is retrieved by client devices via periodically polling the server. Stock prices or live scores associated with sporting events such as basketball or soccer games may remain constant for a given time period or can change unpredictably from one minute to another. Tracking such data to keep the user updated with the latest news necessitates constant, periodic polling of the server by the client devices even at times when the data remains unchanged. This results in wastage of resources for the users operating within the limitations of their fixed data plans and limited device power resources that are drained by the various applications that maintain many connections with multiple data sources to poll the servers and provide notifications/messages to the user.

The embodiments described herein provide for a unified notification platform that pushes different types of data to users via their preferred client/user device(s) without solicitation or even in absence of requests for data from the client devices so that usage of the devices' data and power resources are optimized. FIG. 1 illustrates a unified notification module 100 that provides information from various channels 140 to users in accordance with embodiments described herein. The users can employ different user devices 110, 112, 114 to receive alerts from different channels. The user devices 110, 112, 114 can comprise by the way of illustration and not limitation, HTTP clients, mobile and non-mobile applications. In an embodiment, a user registers with the subscription module 102 in order to receive updates or alerts from the various channels. During the registration process, the user can provide subscription information 152 such as but not limited to, the details of the channels from which the user desires to receive updates/alerts, the entities associated with alerts from the channels where applicable, one or more devices and modalities via which the alerts are to be received, frequency of alerts and other information necessary to deliver information to the user. The unified notification module 100 is configured to provide alerts from various channels 140 that include channels providing public and private data. In an embodiment the channels that provide public information can comprise those with structured data such as but not limited to, weather updates, sports and financial news like stock quotes, updates for applications running on the various devices or those channels with unstructured data such as breaking news. In an embodiment, the channels providing private data can include channels that provide personalized information and which require user authorization/authentication prior to providing information access. The unified notification module 100 also provides alerts from such channels that disseminate private information such as but not limited to emails, instant messages (IMs), short messaging channels (SMS). Particular ones of the various channels 140 can be selected by the user for receipt of alerts. In addition, the unified notification module 100 can also be configured to enable a variety of service criteria based on the requirements associated with each of the services 140. For example, for an IM (Instant Messaging) service, a quality specification of delivering each message exactly once can be implemented whereas for sports scores, a best effort delivery specification can be implemented. In an embodiment, the channels can register with the unified notification module 100 in order to provide events/updates to its registered users. Accordingly, when a new channel registers, a new channel and its associated metadata can be created to receive events emitted by the new channel and providing the corresponding alerts to subscribers of the new service/channel.

In an embodiment, the subscription module 102 can present a user with a unified user interface (not shown) at the time of registration. The user interface allows user registration for receiving event alerts associated with one or more of the various channels 140. When the user selects one of the channels 140, the user interface can be configured to present choices associated with the selected channel to the user. The user's subscription information 152 including the user's selections of the various channels 140 and related options are received and saved to the data store 120 by the subscription module 102.

In an embodiment, the specifications 154 for new alerts to be generated are based on the users' subscription information 152 saved to the data store 120. The alerts module 104 collects public and private events generated by each of the various channels 140, configures event alerts based on the subscription information 152. In an embodiment, each of the channels 140 can be configured to transmit events they generate to the alerts module 104 via associated channels which therefore function as destinations and/or source of events. In an embodiment, each of the channels can be identified by a name formatted as a path component of a URI (Universal Resource Identifier) without parameters. Channels can not only transmit public information wherein all subscribers receive alerts published by the unified notification module 100 on such channels, channels to communicate private information to a particular client can also be created. In an embodiment, when a new channel is initiated or a new subscriber registers with the unified notification module 100 a channel can be registered/created, for example, by the delivery module 106. Creation of a channel includes determining the metadata or attributes for the channel. The channel attributes can comprise a retention policy that determines the number of messages if any that can be retained. The attributes include an expiration policy including the time period after which the retrieved alerts expire and are no longer transmitted to the subscribers, a delivery policy comprising the number of retries, minimum and maximum delays for a target, number of maximum delay retries, throttle policy such as maximum receives per second and authorization model if any is required.

In an embodiment, the alerts module 104 can be configured to request the channels 140 for new events for generating alerts to the users. Event alerts for the users of the unified notification module 100 are configured via applying templates to the received events to generate the alerts. In an embodiment, the templates applied to generate the alerts can depend on the data format associated with the event, security restrictions and end points receiving the alerts. An event alert 154 thus generated is communicated to the delivery module 106 for transmission to the various user devices 110, 112 and 114. It may be appreciated that only one alert 154 is shown by the way of illustration and that at any given time millions of alerts may need to be generated for the various events generated by the channels 140 and received by the unified notification module 100.

The delivery module 106 receives the event alert 154 from the alerts module 104 and pushes it via various modalities based on the user subscription information 152 from the data store 120. In an embodiment, the delivery module 106 identifies the users whose subscription information 152 indicates that they are interested in the generated event alert 154. Thus, the delivery module 106 does not wait for one of the user devices 110, 112 and 114 to make contact/initiate communication or request data. Rather, the delivery module 106 pushes the event alert 154 to selected ones of the user devices 110, 112 or 114 even in the absence of a request message. In an embodiment, one of the user devices 112, 114 or 116 can thus connect to the unified notification module 100 without any specification regarding a resource. However, information from the events is still transmitted to the users via the long-live network connections that the user devices 110, 112 and 114 can maintain with the unified notification platform 100. In an embodiment, each of the user devices 110, 112 or 114 maintain a single HTTP or TCP connection with a server executing the unified notification module 100 to receive the multiple event alerts. For example, a single persistent connection can be maintained via long polling with a HTTP client by the unified notification module 100. This reduces the power expended by the user devices 110, 112, 114 to receive the alerts when compared to making a plurality of connections to receive the various types of event alerts.

In an embodiment, the generated event alert 154 can relate to public data such as alerts regarding a stock reaching a certain value which alert may have subscriptions from a thousand to about a million users. In an embodiment, the generated event alert 154 can relate to private data such as an instant message intended for a single user. When event alerts related to private data such as instant messages, emails or SMS (Short Messaging Service) messages are generated, the delivery module 106 implements the various authentication/authorization procedures to ensure that the private data is forwarded to the intended recipients at an appropriate end point such as an email application or an SMS interface.

In an embodiment, the end point to receive the alert 154 can be selected by a user or it can be determined by the unified notification module 100 based on, for example, the type of data and/or the user's presence information. The delivery module 106 can therefore, configure multiple messages related to one alert 154 based on the various receiving end points. Alternately, a plurality of messages in various formats conveying information from one event alert 154 can be configured by the delivery module 106. For example, information regarding a score update related to a sporting event from one of the channels 140 providing sports information can be conveyed to subscribing users via SMS messages, IMs, emails, or even a proprietary user interface associated with the sports information channel. In another example, if it is determined that an IM cannot be delivered via a user selected end point such as a proprietary app associated with the IM, the unified notification module 100 can be configured to deliver the IM to the user within a web browser and/or other mobile 'apps'. The generated event alerts can be associated with both public data for which no authentication is needed and private data which requires authentication. Furthermore, a single user can receive multiple event alerts related to different data types at one or more end points.

FIG. 2 is a schematic diagram of a unified user interface 254 that facilitates alerts creation and management by the users of the unified notification module 100. It may be appreciated that the user interface 254 is shown only by the way of illustration and that other user interfaces can be employed with the unified notification module 100 to display available alert channels, collect user information and enable event alert management. The user interface 254 is presented to the user in response to the user request for registration. It comprises a channel listing section 302 wherein various alert generation channels are listed for user selection. Channels providing information regarding breaking news, daily news, Fantasy sports, stocks, travel destinations, weather watch or blogs can be selected by the user. Section 304 shows the channels selected by the user. For example, section 304 shows that the user selected to receive event alerts regarding three stocks and one travel destination. Section 306 shows the user interface that is presented when the user selects stocks watch channel for receiving alerts. It shows the various criteria such as the stock symbol, price rise or fall in terms of absolute prices or percentages for generating alerts. Section 308 shows the various modalities such as email, IM, or a SMS to a mobile device via which a user can choose to receive event alerts. In addition, the keyword news channel is selected which causes the presentation of section 310 that includes criteria for forwarding news items associated with "Include" keywords or filtering away the event alerts associated with "Do not include" keywords. Section 310 shows the frequency of delivering the event alerts. For example, the user selects to receive the keyword news alerts on a daily basis. A unified notification platform as discussed herein further facilitates centralized alerts management so that all alerts associated with a multitude of channels 140 may be turned on or off with a single user input 312 thereby mitigating the need for users to separately activate/deactivate each of the channels 140.

Figure 3:
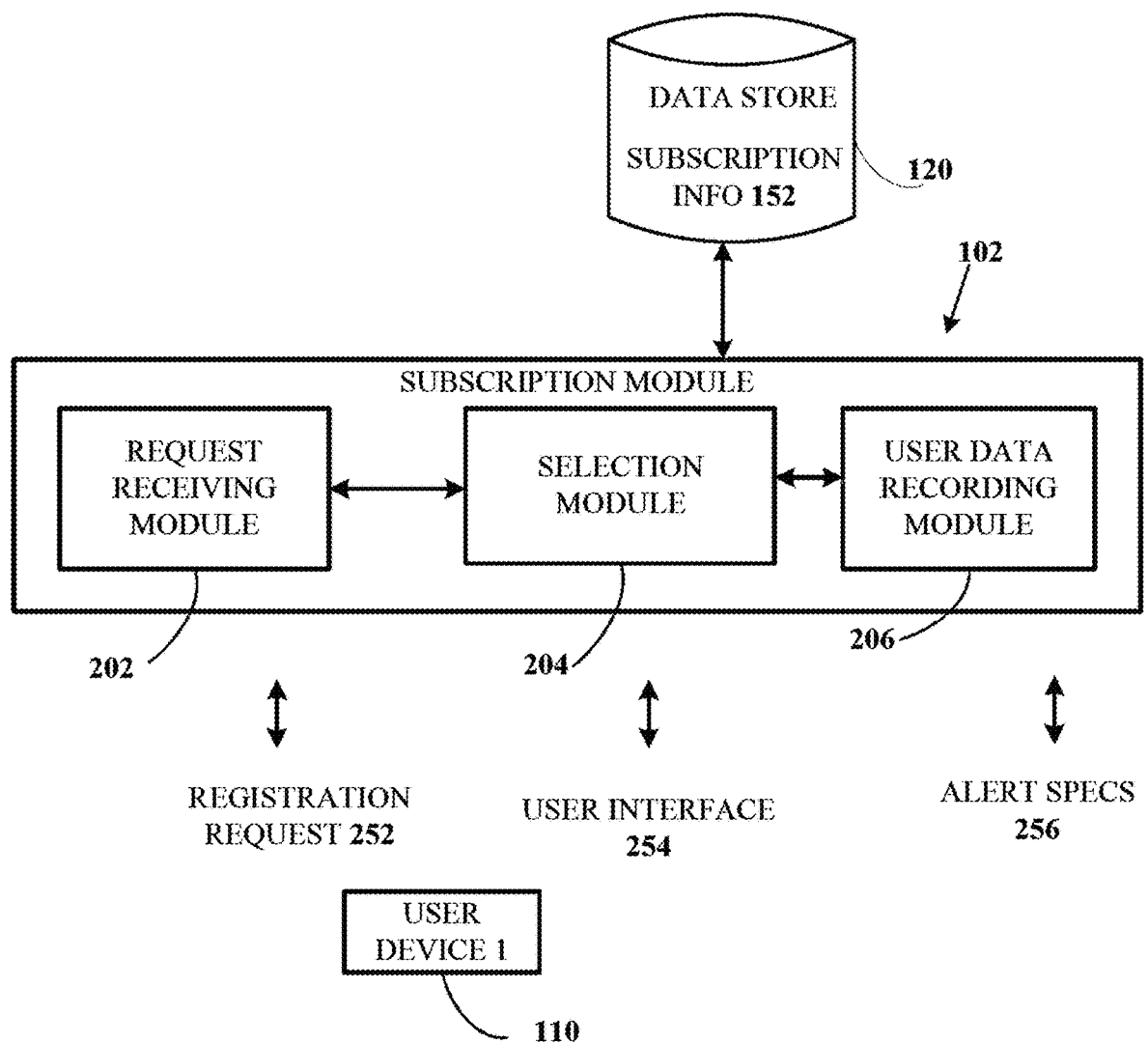
FIG. 3 is a block diagram showing the internal modules of the subscription module in accordance with one embodiment.

FIG. 3 is a block diagram showing the internal modules of the subscription module 102 in accordance with one embodiment. In an embodiment, the subscription module 102 further comprises a request receiving module 202, a selection module 204 and a user data recording module 206. When a user request for registration 252 with the unified notification module 100 is received by the request receiving module 202, the user interface module 204 provides a unified user interface 256 to the user to facilitate the user to register to receive notifications or event alerts from the plurality of channels 140 which comprise services providing public data and private communications. The unified notification module 100 provides access to different services having a variety of service quality specifications associated therewith. In an embodiment, channels 140 providing private data addressed to particular users such as emails or instant messages can cause the unified notification module 100 to implement separate authentication or authorization protocols in order to verify user identity prior to forwarding alerts.

When the user selects a channel, options associated with the selected channel are presented via a unified user interface 254 by the selection module 204. For example, if the user selects a financial information service, options such as but not limited to, the financial entities related to which the user desires updates, the events associated with the entities that are of user interest, frequency of updates, modalities for delivering the events and other options can be presented for the user's selection. The user selected options are recorded with other user information as subscription information 152 in the data store 120 and is used for producing specifications 256 for the alerts to be generated by the alerts module 104.

In an embodiment, a user's selections and associated criteria can be stored as an alert specification alternately referred to as alert spec., within the data store 120 and used for generating messages to the user. By the way of illustration and not limitation, if a user selects to receive an alert for an event where the stock price of YAHOO! exceeds $20.00, an alert specification for a query "select price from quotes where symbol="YHOO" and price>=20" can be generated as stored as "channel/quotes/yahoo_20+". When an event that matches the alert spec is received, it is automatically forwarded to the users who have subscribed to the channel 'quotes' and whose criteria to receive the message match that of the alert spec.

Figure 4:
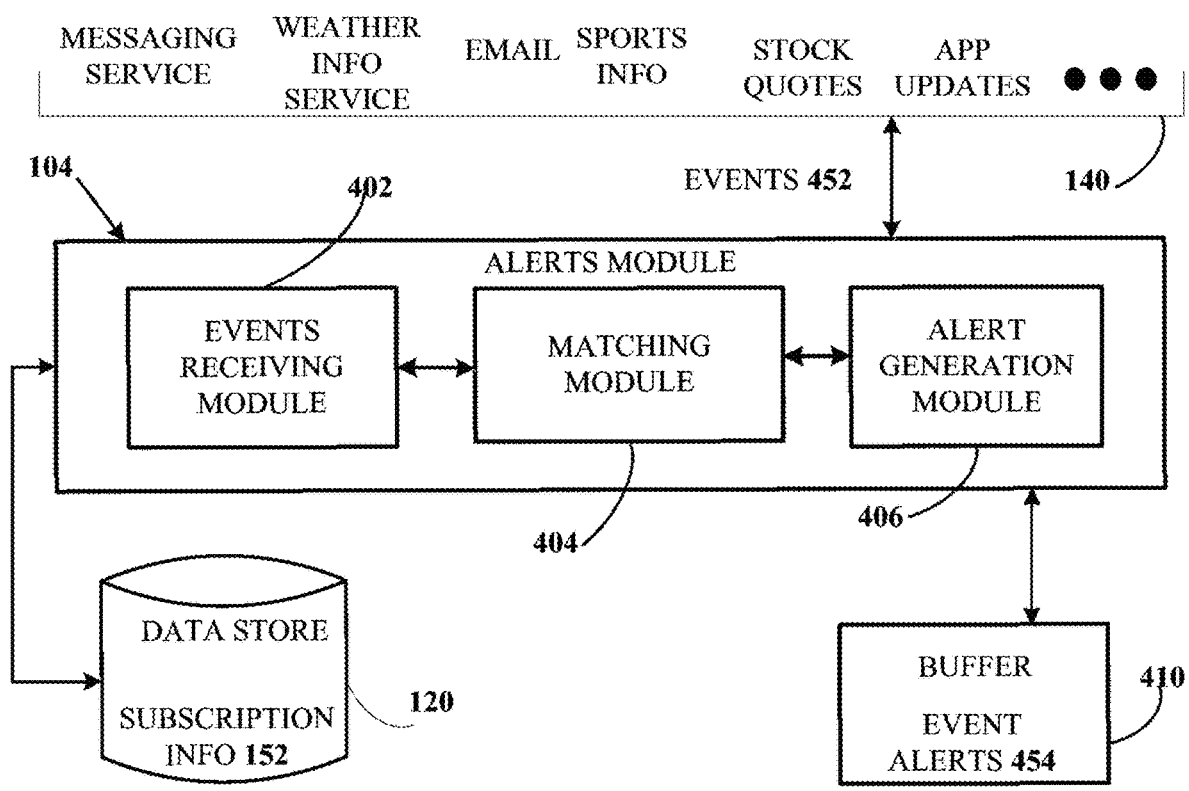
FIG. 4 shows a schematic diagram of the alerts module in accordance with one embodiment.

FIG. 4 shows a schematic diagram of the alerts module 104 in accordance with one embodiment. The alerts module 104 receives events 452 generated by the various channels 140 and configures alerts 454 in accordance with specifications associated with respective channels. Each of the channels 140 can have different service quality requirements. Based on the channel characteristics, the delivery module 106 can deliver the alerts as best effort or guaranteed service. By the way of illustration and not limitation, there can be upgrades associated with about ten or twenty application (channels) to be sent to approximately a million subscribers who may have registered to receive at least a subset of the events associated with the application upgrades. Accordingly, each user device can have multiple channels as each user may have registered to receive multiple ones of the available application upgrades. Thus, the alerts generation module 104 is configured to generate about a million alerts corresponding to the channels and subscribers who registered to receive the upgrades associated with such channels. Similar criteria can exist with respect to stock/sports notification channels. For example, there are hundreds of publicly listed stocks and games being played so the associated channels may have hundreds of channels. Each of the channels serves alerts associated with a respective stock/ game on best-effort basis to subscriber population ranging from a few thousand to millions of registered users. Other channels providing individual events such as chat, mail counter, messenger may have channels based on the number of alerts to be provided by the channels since the alerts are addressed to individuals and accordingly can require authorization prior to delivery. The alerts module 104 is thus configured to produce alerts for events from the multitude of channels providing public or private data and wherein each channel may have unique requirements.

The events receiving module 402 receives events from the various channels 140. In an embodiment, the events can be pushed by the channels to the events receiving module 402. In an embodiment, the events receiving module 402 can poll the channels at regular intervals to receive the events. Again, based on the type of information being provided, a channel may generate events either rapidly to be sent to millions of subscribers or at a slower pace for fewer subscribers.

When an event is received, the matching module 404 matches the received event to the alerts specifications or rules associated with each registered user of the unified notification platform 100 in order to identify the users who have subscribed to receive alerts/updates associated with the received event. Based on the channel providing the event, only a single user or millions of users may be identified by the matching module 404. For example, if the received event was generated by a messenger service a single user may be identified by the matching module 404 for receiving the event alert whereas if the received event was generated by a sports update service, millions of users may be identified by the matching module 404 to receive alerts associated with the event. In an embodiment, the matching module 404 can execute such matching based on the subscription information 152 in the data store. For example, instead of forwarding all updates regarding a particular stock to the millions of users registered with a financial new service, the matching module 404 enables the financial news service to forward alerts regarding particular events associated with a financial entity to users who specify criteria that are satisfied by the event and who have subscribed to receive those events at a desired frequency and on their chosen device(s).

The alerts generation module 406 applies template(s) to the events to generate event alerts. The templates can be applied to generate a plurality of alerts for a given event. For example, a received event may need to be forwarded to a plurality of clients such as, HTTP and non-HTTP clients executed on different devices. Accordingly, multiple templates can be applied to a single received event to generate a plurality of alerts to be forwarded to the HTTP and non-HTTP clients being executed on the various devices. In an embodiment, the alerts generation module 406 can further specify service level requirements such as that the generated alert is a best effort delivery or a guaranteed delivery. In an embodiment, the generated alerts can be forwarded to the delivery module 106 for further transmission to the user. In an embodiment, the generated alerts are buffered upon generation. The buffer 410 is accessed by the delivery module 106 in order to push the event alerts 454 to the users. The alert generation module 406 can be further configured to set a message state indicating the status of the message as new, acted or deleted which facilitates the delivery module 106 to identify messages from the buffer that are to be pushed to the subscribers.

Figure 5:
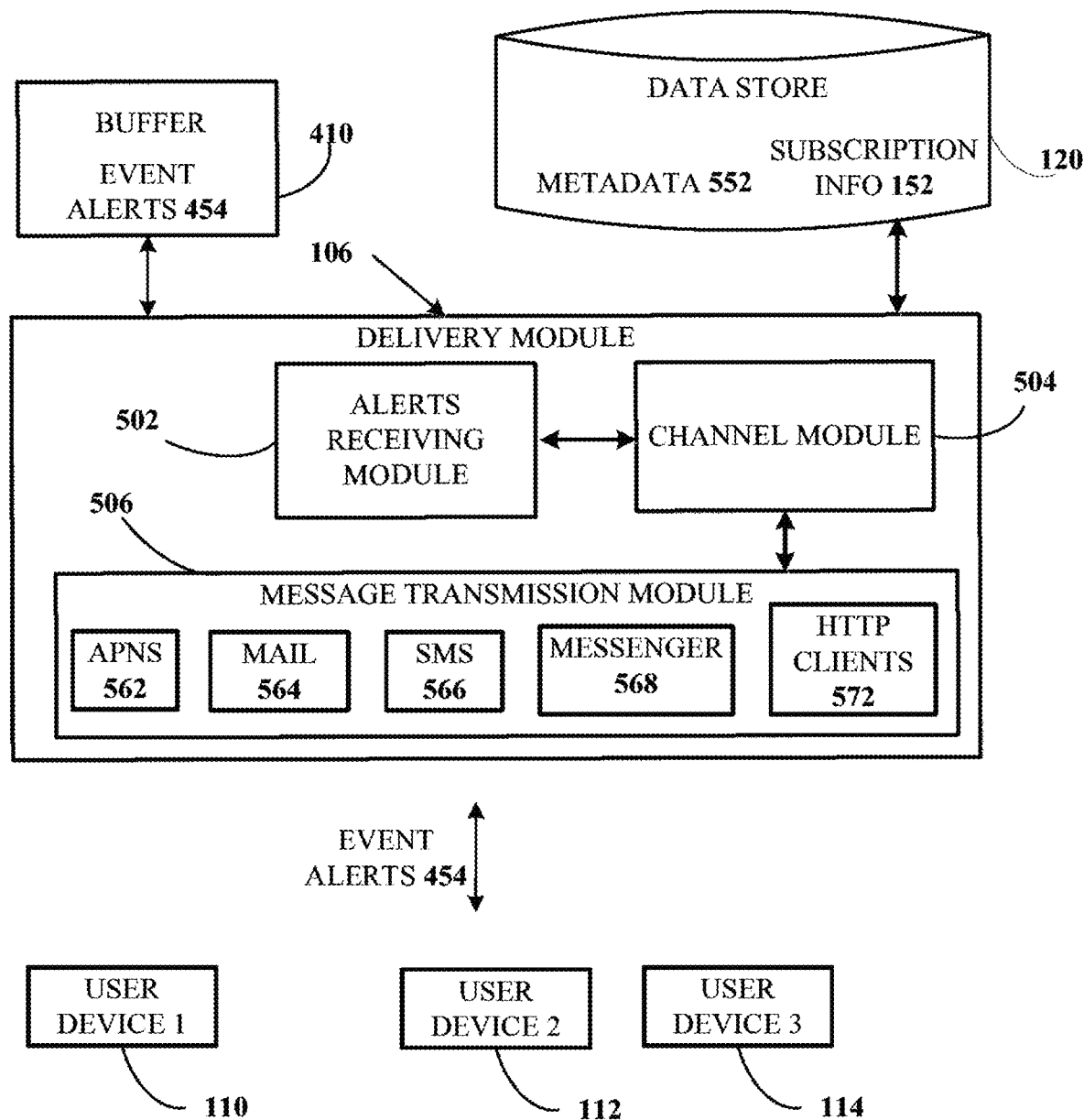
FIG. 5 shows a schematic diagram of the delivery module in accordance with one embodiment.

FIG. 5 shows a schematic diagram of the delivery module 106 in accordance with one embodiment. The delivery module 106 receives event alerts 454 and generates corresponding messages 554 to be pushed to the subscribers. In an embodiment, the delivery module 106 comprises an alerts receiving module 502, a channel module 504 and a message transmission module 506. The alerts receiving module 502 accesses the buffered event alerts 454 generated by the alerts module 104. The channel module 504 identifies the appropriate channel associated with each of the received alerts 454 and publishes them to the appropriate channels. In an embodiment, a channel can have associated channel metadata 552 that specifies message transmission criteria such as retention policy, expiration policy, delivery policy, throttle policy and an authorization model for example, OAuth 2.0. The message transmission module 506 transmits the alerts 454 to the user devices 110, 112 and/or 114 through one or more of the plurality of user agents 562, 564, 566, 568 and 572 in accordance with the channel metadata and user specified criteria. Each of the user agents is in turn configured to interact with the corresponding push services such as APNS Apple Notification Services, email service, SMS service, messenger services and HTTP push services such as CometD per well-defined protocol such as for example Bayeux protocol. The delivery module 106 is thus configured to interact with the plurality of push services to provide event alerts via various modalities. In an embodiment, messages can be transmitted to HTTP clients via long-live HTTP connections. The delivery module 106 can be further configured to leverage the plurality of user agents 562-572 in order to efficiently deliver the alerts 454. For example, if it is determined that one of the messages 554 with a guaranteed delivery service specification cannot be delivered via a preferred one of the user agents 562-572 an alternate one of the user agents 562-572 can be identified by the delivery module 106 to deliver the alert. In an embodiment, if a channel associated with one of the received alerts does not exist, the channel module 504 can be configured to create a channel for the message(s). In an embodiment, each of the user devices 110, 112 and 114 maintains a single HTTP/TCP connection with the unified notification module 100 to receive one or more of the alerts 454.

Figure 6:
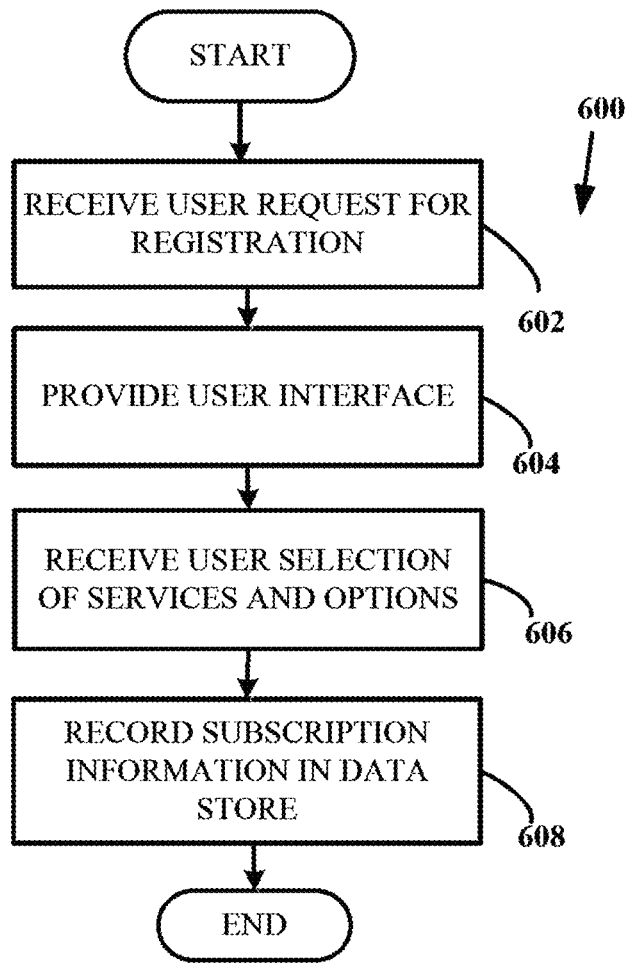
FIG. 6 shows a flowchart that details a method implemented by the subscription module for receiving subscription from a user to receive messages from the unified notification module.

FIG. 6 shows a flowchart 600 that details a method implemented by the subscription module 102 for receiving subscription from a user to receive messages from the unified notification module 100. The method begins at 602 with receiving a user request for registration. At 604, a user interface 254 associated with the unified notification module 100 is provided to the user for selection of the various channels 140 and associated criteria in accordance with embodiments described herein. The user interface 254 thus facilitates as a single registration point for multiple channels providing public and private data to the users. Thus, based on the channel selected by the user, the user interface 254 may alter to show associated options for user selection. At 606 user selections from the channels 140 and their associated options are received and recorded in the data store 120 at 608. The options thus stored are used to recognize events relevant to the user and generate appropriate alerts for transmitted to the user. In an embodiment, based on the received options, new channels can be created in accordance with embodiments described herein. For example, when a user subscribes to receive private information for services such as email, IM, chat or SMS a channel with appropriate authentication procedures can be created.

Figure 7:
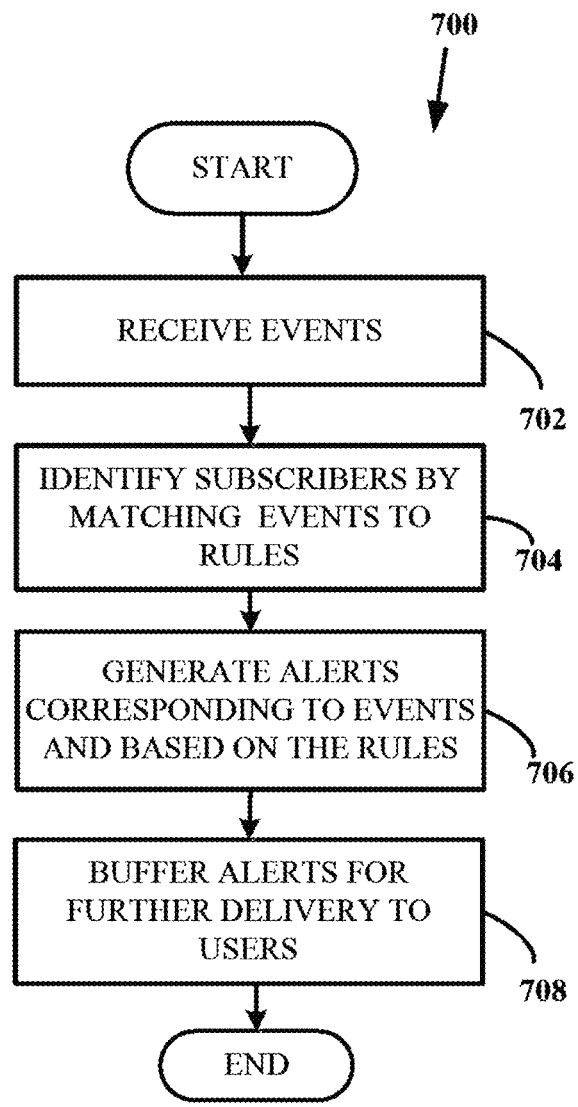
FIG. 7 is a flowchart that shows details of a method of generating alerts in accordance with one embodiment.

FIG. 7 is a flowchart 700 that shows details of a method of generating alerts in accordance with one embodiment. The method begins at 702 with the alerts module 104 receiving an event from one of the channels 140. It may be appreciated that the events can be generated by public data sources such as new update channels or other users of the channels 140 such as but not limited to email/IM/SMS/Chat users. At 704, the received event is matched to the rules in the data store 120 in order to identify subscribers who registered to receive updates regarding the received event. If the event is associated with a public data source such as a new service, sports, financial or weather updates, millions of users can be identified at step 704 for forwarding alerts reporting the received event. If the received event is associated with private information source such as an email addressed to a single recipient or an instant message or a message associated with SMS, only one user is identified at 704 for receiving alerts generated from the received event. At 706, one or more alerts for the received event are generated in accordance with options specified by the user (s). In an embodiment, a new alert specification can be generated for one or more channels based on the options selected by the user at the time of registration. The event alerts or messages at 706 are generated based on the specifications. Thus, two users can receive two different alerts related to the same event. For example, if the received event is associated with a public data source, an alert associated with the received event for transmission via SMS to a first subset of the subscribers can be generated at 706. However, another alert for transmission via another modality, for example, email, may also be generated at 706 for transmission to a second subset of subscribers. At 708, the alerts thus generated are buffered for further access by the delivery module 106.

Figure 8:
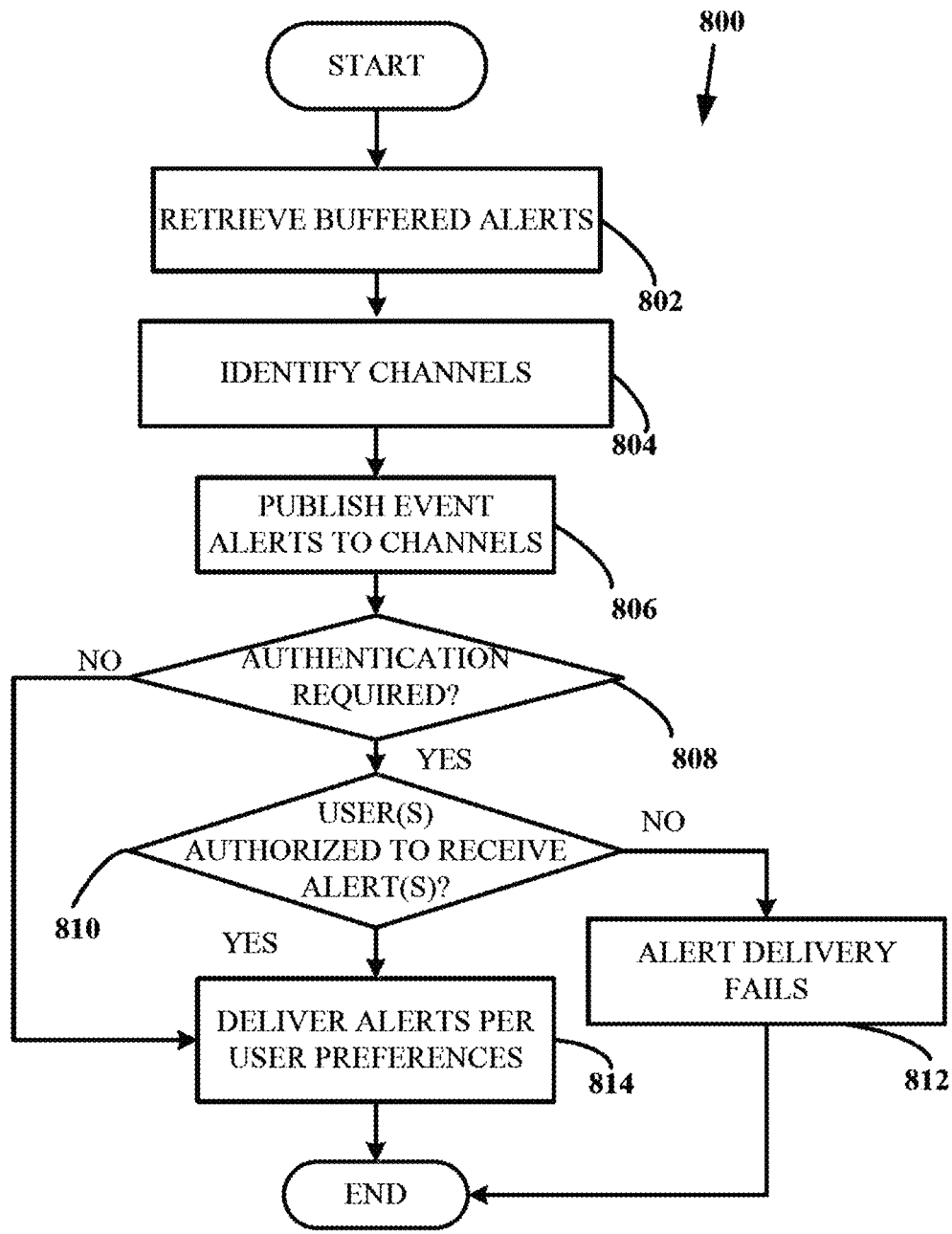
FIG. 8 is a flowchart detailing a method of delivering event alerts corresponding to the event alerts in accordance with one embodiment.

FIG. 8 is a flowchart 800 detailing a method of delivering event alerts corresponding to the event alerts in accordance with one embodiment. At 802 the buffer 410 is accessed by the delivery module 106 to retrieve the event alerts 454. At 804 the various channels associated with the retrieved alerts are identified. Each alert has associated therewith a channel, however, as multiple alerts can be created from a single event, two or more alerts can be associated with one channel. Based on the type of event alerts being published to the channel a single channel can have only one subscriber or it may have millions of subscribers. For example, channels to which private event alerts such as IMs, SMS or mail counters are published can have only one subscriber whereas channels to which public event alerts such as sports scores or new updates are published can have numerous subscribers. Based on the type of event alerts retrieved at 802 various channels for event alert publication are identified at 804. As described herein, a channel which can be identified by a name and serves as a source and/or destination for event alerts. At 806 the event alerts are published to the various channels associated therewith. In an embodiment, event alerts of different formats can be published to one channel as a single event from one of the channels 140 can result in generation of multiple event alerts by the alerts module 102. Based at least on on the channel metadata it is determined at 808 if any authentication is required prior to transmitting the event alerts to the users. For example, channels associated with public data such as news updates or sports news may not require authentication whereas channels to which private data such as emails, IMs or SMS information is published require user authentication. Hence, if different event alerts are published to a variety of channels at 806, a first subset of the channels may require user authentication whereas a second subset of the channels may not require any user authentication. Based on such determination at 808, event alerts on channels not requiring user authentication are transmitted directly at 814. As event alerts may have different formats different mechanisms for transmission such as but not limited to the plurality of push services such as APNS Apple Notification Services 562, email service 564, SMS service 566, messenger services 568 and HTTP push services 572 such as CometD can be employed by the delivery module 106 per well-defined protocol for an event alert delivery at 814. If it is determined at 808 that user authentication is necessary prior to event alert transmission, the delivery module 106 further determines at 810 if each subscriber receiving event alerts on the secure channel is authorized to receive the event alerts. If the subscriber(s) are authorized the event alerts are delivered at 814 in accordance with embodiments described herein. Thus, the delivery module 106 in accordance with embodiments described herein can have built-in steps for authentication so that only authorized subscribers/devices receive the event alerts at 814. If the subscribers are not authorized, the event alert delivery fails as shown at 812. It may be noted that multiple event alerts on different channels can be delivered to a subscriber at 814 via a single connection maintained by the device associated with the subscriber with the unified notification module 100.

Figure 9:
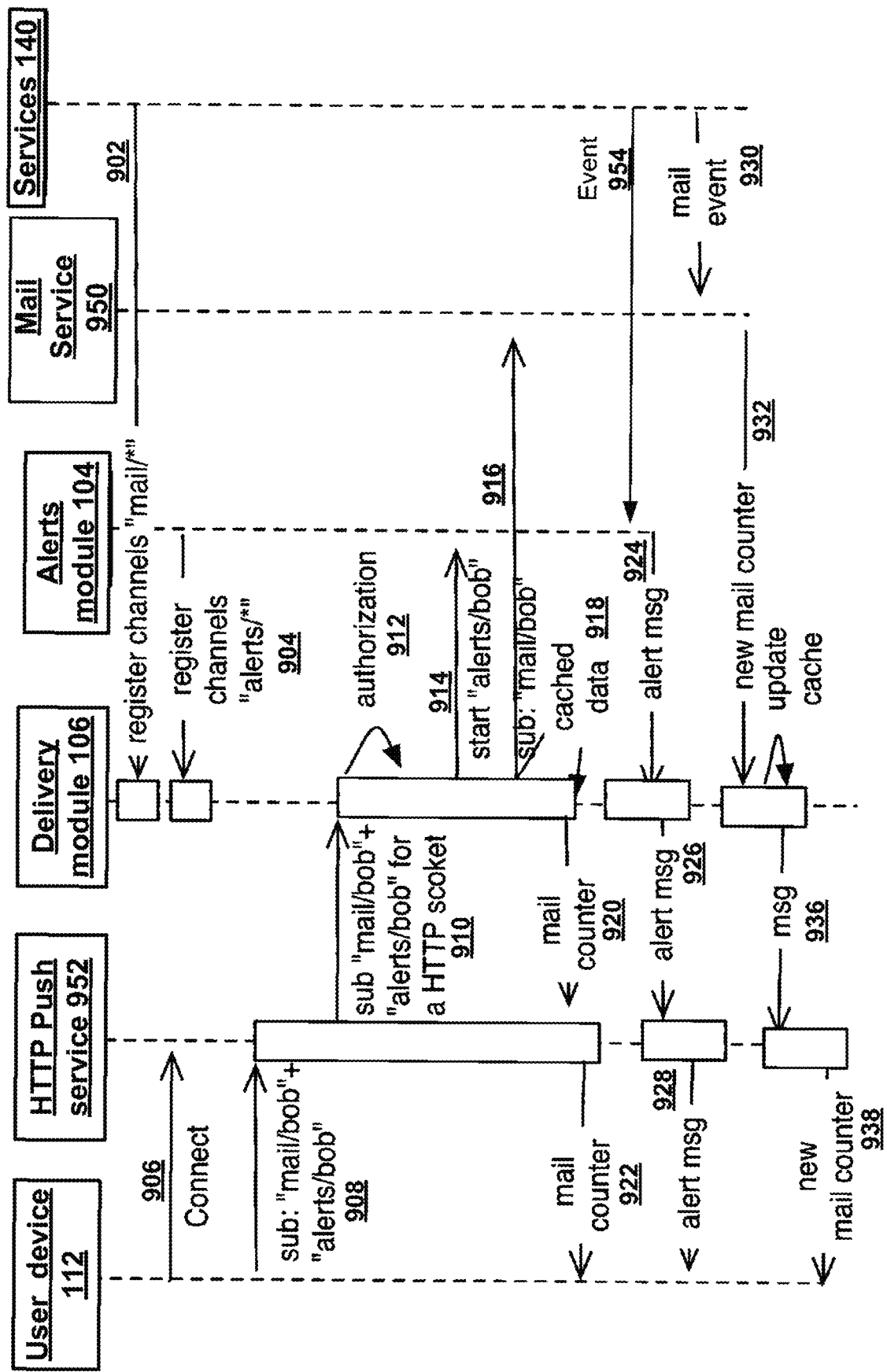
FIG. 9 shows data flow in a communication session between a HTTP client on a user device and the unified notification platform in accordance with one embodiment.

FIG. 9 shows data flow in a communication session between a HTTP client on a user device 112 and the unified notification module 100 in accordance with one embodiment. At 902 and 904 a mail channel is initially registered with the universal notification module 100 including the alerts module 104 and delivery module 106 to provide mail alerts to subscribers. When a user device, for example, the user device 112 initially connects 906 to the universal notification module 100, a request 908 can be made to the HTTP push service to provide alerts for the user Bob's mail counter. The HTTP push service 952 forwards the request at 910 to the delivery module 106. Based on the channel metadata, the delivery module 106 implements an authentication model to determine if the user 'Bob'/user device 112 is authorized to receive the mail counter alerts for the mail channel associated with the user 'Bob' at 912. It the user device 112/the user 'Bob' is authorized, the delivery module 106 accesses 914 the mail alerts data which may have been buffered at 916 by the alerts module 104 when events were emitted by the mail service 950. Accordingly, the cached data is retrieved 918 by the delivery module 106 and the mail counter information is received 920 by the delivery module 106 which in turn forwards 922 it to the user device 112 in accordance with user-specified criteria. In an embodiment, the connection that was initially established at 906 can be used to forward 928 an alert message the HTTP push service to the user. The alert message can be associated with an event 954 occurring with one of the channels 140 other than the mail service 950. Accordingly, the alerts module 104 generates and forwards 924 an alert to the delivery module 104 which in turn transmits 926 the corresponding message to the HTTP push service 952. Subsequently, a new mail event 930 is generated and accordingly, a new mail event alert 932 updates the mail counter in the cache. A message indicating the new mail counter is transmitted to the user at 938 via the HTTP push service 952 as shown at 936 using the HTTP connection established at 902.

Figure 10:
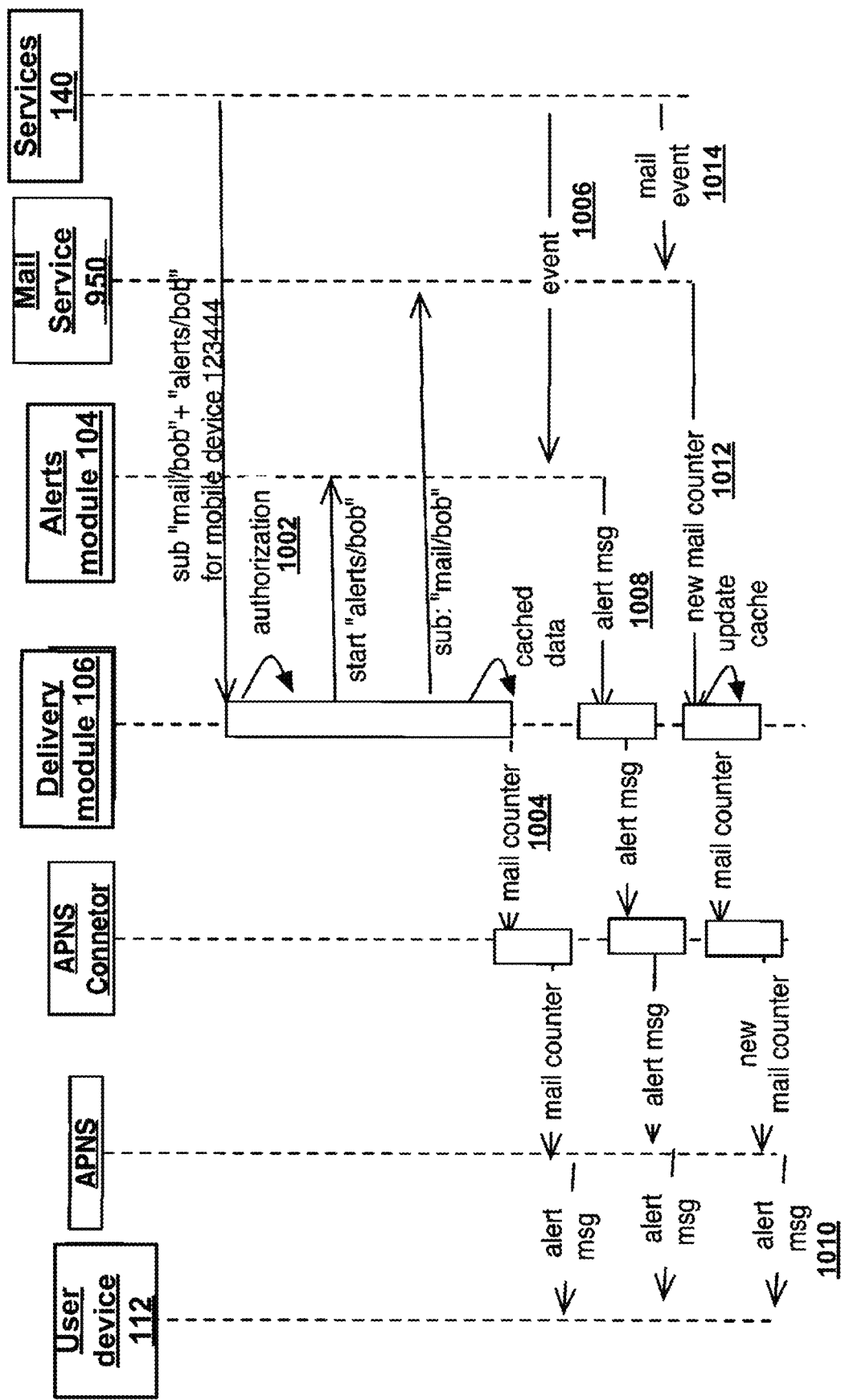
FIG. 10 shows data flow in a communication session between a non-HTTP client on a user device and the unified notification platform in accordance with one embodiment.

FIG. 10 shows data flow in a communication session between a non-HTTP client on a user device 112 and the unified notification module 100 in accordance with one embodiment. Similar data flow as shown in FIG. 9 occurs, however, it may be noted that no initial action as shown at 902 from the user device 112 occurs. Rather the user Bob is authorized at 1002 to receive alerts and accordingly, the mail counter 1004 comprised in the cached data is forwarded to Bob. In an embodiment, the delivery module 106 can determine that Bob is available via his user device 112 which may be an iPhone and hence the mail counter 1004 is forwarded via the native APNS (Apple Notification Services). Similarly, an alert 1008 associated with an event 1006 from one of the channels 140, other than the mail service 950 and an alert 1010 regarding update 1012 at the mail counter is forwarded to Bob when a mail event 1014 is emitted by the channels 140.

Figure 11:
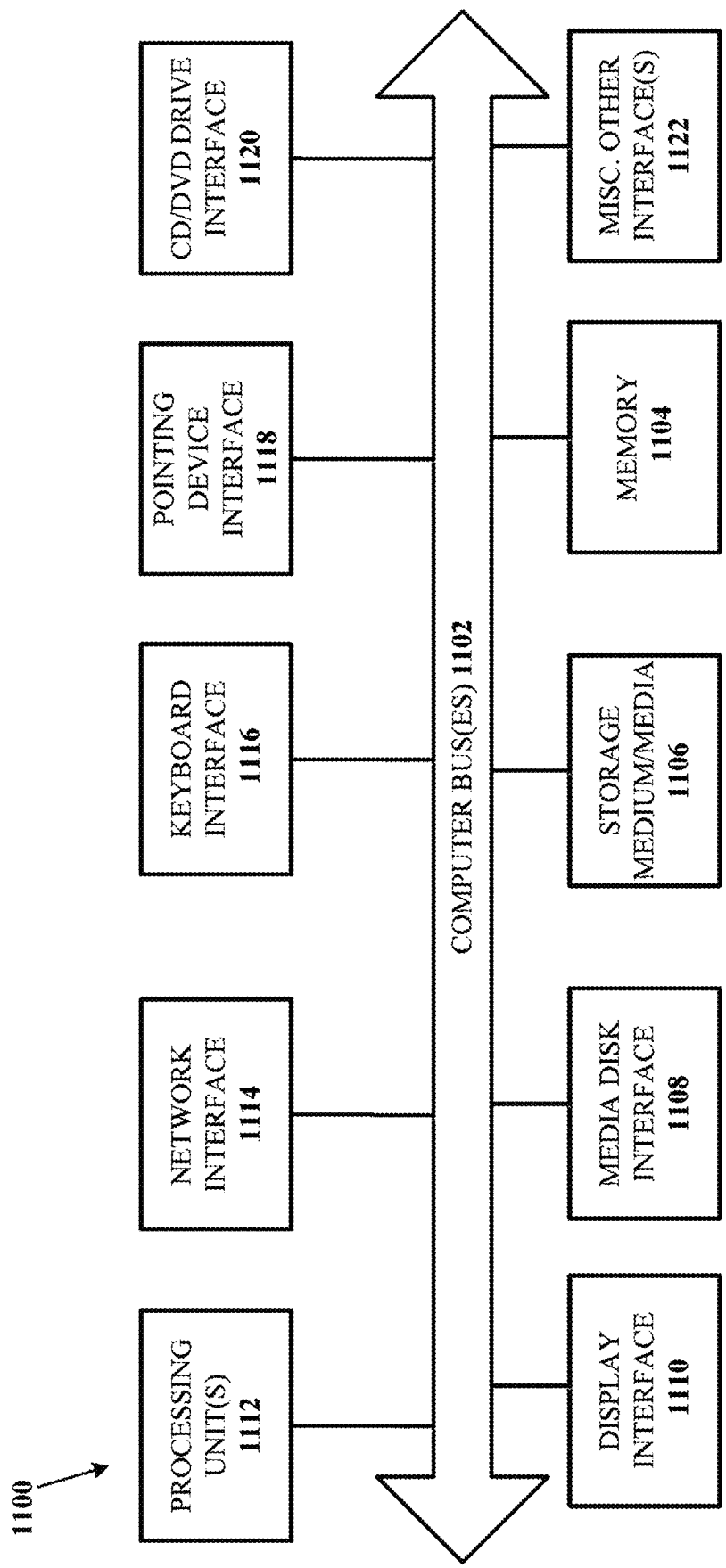
FIG. 11 illustrates internal architecture of a computing device in accordance with embodiments described herein.

As shown in the example of FIG. 11, internal architecture of a computing device 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108, an interface 1120 for a drive that can read and/or write to media including removable media such as floppy, CD-ROM, DVD, etc., media, display interface 1110 as interface for a monitor or other display device, keyboard interface 1116 as interface for a keyboard, pointing device interface 1118 as an interface for a mouse or other pointing device, and miscellaneous other interfaces 1122 not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code or logic, and/or computer-executable process steps, incorporating functionality described herein, e.g., one or more of process flows described herein. CPU 1112 first loads computer-executable process steps or logic from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, metadata, playlists and other files. Persistent storage medium/media 1106 can further include program modules/program logic in accordance with embodiments described herein and data files used to implement one or more embodiments of the present disclosure.

Figure 12:
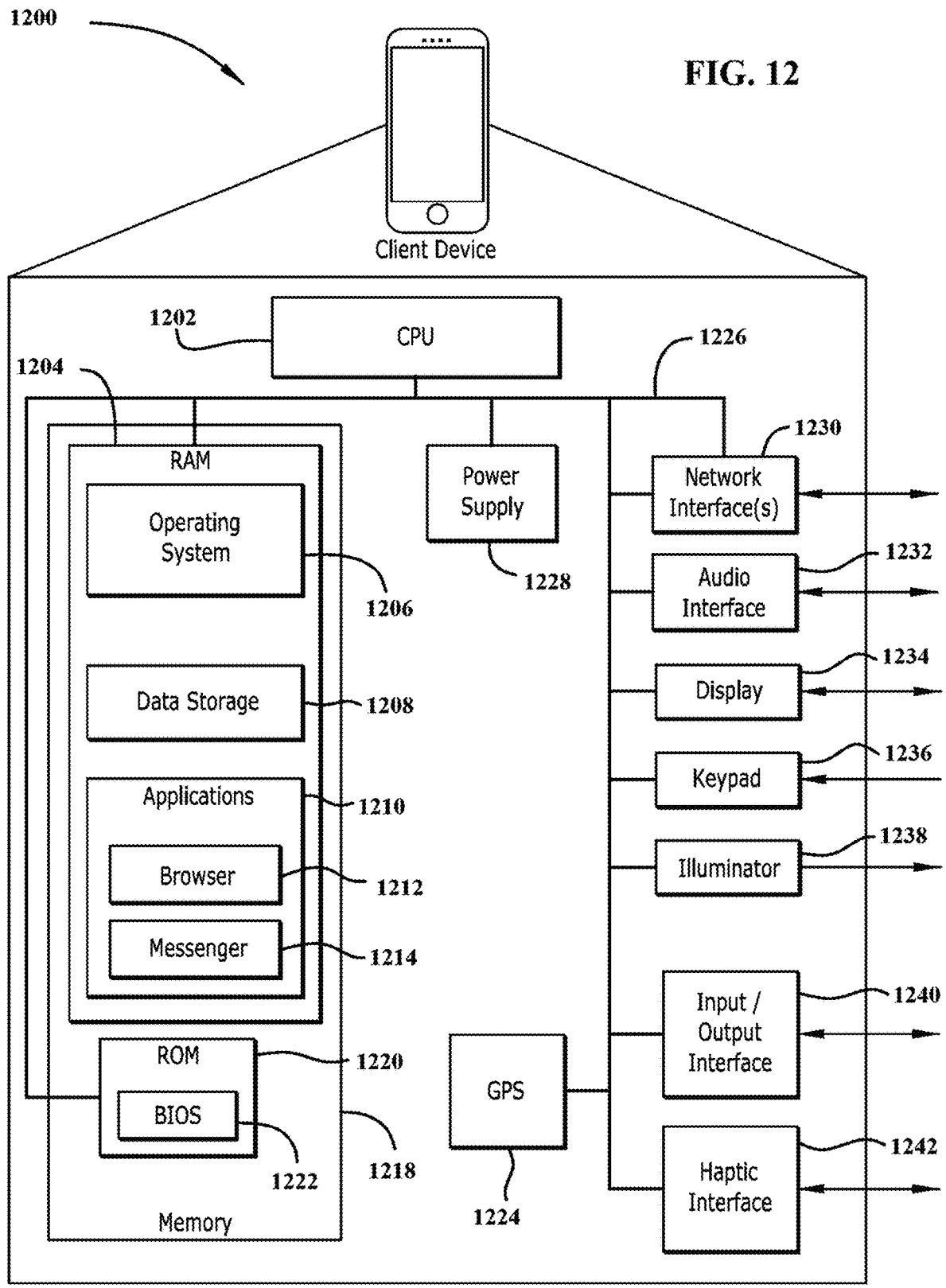
FIG. 12 is a schematic diagram illustrating a client device implementation of a computing device in accordance with embodiments of the present disclosure.

FIG. 12 is a schematic diagram illustrating a client device implementation of a computing device in accordance with embodiments of the present disclosure. A client device 1200 may include a computing device capable of sending or receiving signals, such as via a wired or a wireless network, and capable of running application software or "apps" 1210. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1202, power supply 1228, a memory 1218, ROM 1220, BIOS 1222, network interface(s) 1230, audio interface 1232, display 1234, keypad 1236, illuminator 1238, I/O interface 1240 interconnected via circuitry 1226. Claimed subject matter is intended to cover a wide range of potential variations. For example, the keypad 1236 of a cell phone may include a numeric keypad or a display 1234 of limited functionality, such as a monochrome liquid crystal display (LCD) for displaying text. In contrast, however, as another example, a web-enabled client device 1200 may include one or more physical or virtual keyboards 1236, mass storage, one or more accelerometers, one or more gyroscopes, global positioning system (GPS) 1224 or other location identifying type capability, Haptic interface 1242, or a display with a high degree of functionality, such as a touch-sensitive color 2D or 3D display, for example. The memory 1218 can include Random Access Memory 1204 including an area for data storage 1208.

A client device 1200 may include or may execute a variety of operating systems 1206, including a personal computer operating system, such as a Windows, iOS or Linux, or a mobile operating system, such as iOS, Android, or Windows Mobile, or the like. A client device 1200 may include or may execute a variety of possible applications 1212, such as a client software application 1214 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1200 may also include or execute an application to communicate content, such as, for example, textual content, multimedia content, or the like. A client device 1200 may also include or execute an application 1212 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method, comprising:
   receiving, by a processor, a plurality of subscription requests from a plurality of users for notifications associated with a plurality of notification channels, each notification channel comprising functionality for hosting and providing information over a network to the plurality of users;
   communicating, by the processor, with client devices of the plurality of users, to cause the display of a unified user interface for receiving user input;
   receiving, by the processor via the unified user interface, user subscription data from the plurality of users, the user subscription data for at least two notification channels, wherein each of the at least two notification channels has a channel quality that is disparate from the other notification channel;
   receiving, by the processor, an event from each of the at least two notification channels;
   identifying, by the processor, based on the user subscription data, at least one of the plurality of users that subscribed to the at least two notification channels;
   receiving, by the processor, requests for event alerts from client devices of the at least one of the plurality of users;
   storing, by the processor, the requests without response until the events alerts are generated;
   generating, by the processor, the event alert for each of the at least two notification channels, each event alert comprising information based on the user subscription data for one of the at least two notification channels and the event received from the one of the at least two notification channels; and
   transmitting, by the processor, over the network, via a single connection, each of the generated event alerts to one of the client devices associated with the identified at least one of the plurality of users, said transmitting the generated event alerts comprises:
      selecting, by the processor, a user agent for transmitting the generated event alerts; and
      pushing, by the processor, the generated event alerts to the one of the client devices via the selected user agent.

2. The method of claim 1, wherein the user subscription data comprises user selected options associated with user specified criteria specifying user desired features of the event alerts.

3. The method of claim 2, further comprising:
   creating, by the processor, based on the user selected options, new notification channels.

4. The method of claim 1, wherein identifying the at least one of the plurality of users comprises matching the user subscription data with the received event from each of the at least two notification channels.

5. The method of claim 1, wherein identifying the at least one of the plurality of users comprises matching the received event to rules in a data store.

6. The method of claim 1, wherein generating each of the event alerts comprises generating different alerts for different identified users based on a same received event.

7. The method of claim 1, wherein the generated alerts an buffered before transmission.

8. The method of claim 1, wherein transmitting the generated event alerts further comprises:
   identifying, by the processor, a respective channel for each of the generated event alerts; and
   publishing, by the processor, each of the generated event alerts to the respective identified channels.

9. The method of claim 1, wherein the received events from the at least two notification channels are the same.

10. The method of claim 1, wherein the received events from the at least two notification channels are different.

11. The method of claim 1, wherein transmitting the generated event alerts comprises:
    creating, by the processor, a respective channel for each of the at least two notification channels to deliver each respective event alert.

12. A computing system comprising:
    at least one processor; and
    a non-transitory computer-readable storage medium for tangibly storing thereon program logic for execution by the processor, the program logic comprising:
       subscription request receiving logic, executed by the processor, for receiving a plurality of subscription requests from a plurality of users for notifications associated with a plurality of notification channels, each notification channel comprising functionality for hosting and providing information over a network to the plurality of users;
       user interface providing logic, executed by the processor, for communicating with client devices of the plurality of users, to cause the display of a unified user interface for receiving user input;
       subscription data receiving logic, executed by the processor, for receiving, via the unified user interface, user subscription data from the plurality of users, the user subscription data for at least two notification channels, wherein each of the at least two notification channels has a channel quality that is disparate from the other notification channel;
       event receiving logic, executed by the processor, for receiving an event from each of the at least two notification channels;
       identification logic, executed by the processor, for identifying, based on the user subscription data, at least one of the plurality of users that subscribed to the at least two notification channels;
       receiving logic, executed by the processor, for receiving requests for event alerts from client devices of the at least one of the plurality of users;
       storage logic, executed by the processor for, storing the requests without response until the events alerts are generated;
       generating logic, executed by the processor, for generating the event alert for each of the at least two notification channels, each event alert comprising information based on the user subscription data for one of the at least two notification channels and the event received from the one of the at least two notification channels; and transmitting logic, executed by the processor, for transmitting, over the network, via a single connection, each of the generated event alerts to one of the client devices associated with the identified at least one of the plurality of users, wherein the alert transmitting logic further comprises:

user agent selecting logic, executed by the processor, for selecting a user agent for transmitting the generated event alerts; and pushing logic, executed by the processor, for pushing the generated event alerts to the one of the client devices via the selected user agent.

13. The system of claim 12, wherein the user subscription data comprises user selected options associated with user specified criteria specifying user desired features of the event alerts.

14. The system of claim 12, wherein the identifying logic comprises:

matching logic, executed by the processor, for matching the user subscription data with the received event from each of the at least two notification channels.

15. The system of claim 12, wherein the transmitting logic further comprises:

channel identifying logic, executed by the processor, for identifying a respective channel for each of the generated event alerts; and alerts publishing logic, executed by the processor, for publishing each of the generated event alerts to the respective identified channels.

16. A non-transitory computer readable storage medium tangibly encoded with computer-executable instructions, that when executed by a processor, cause the processor to:

receive a plurality of subscription requests from a plurality of users for notifications associated with a plurality of notification channels, each notification channel comprising functionality for hosting and providing information over a network to the plurality of users;

communicate with client devices of the plurality of users, to cause the display of a unified user interface for receiving user input;

receive, via the unified user interface, user subscription data from the plurality of users, the user subscription data for at least two notification channels, wherein each of the at least two notification channels has a channel quality that is disparate from the other notification channel;

receive an event from each of the at least two notification channels;

identify, based on the user subscription data, at least one of the plurality of users that subscribed to the at least two notification channels;

receive requests for event alerts from client devices of the at least one of the plurality of users;

store the requests without response until the events alerts are generated;

generate the event alert for each of the at least two notification channels, each event alert comprising information based on the user subscription data for one of the at least two notification channels and the event received from the one of the at least two notification channels; and transmit, over the network, via a single connection, each of the generated event alerts to one of the client devices associated with the identified at least one of the plurality of users, said transmitting the generated event alerts causes the processor to:

select a user agent for transmitting the generated event alerts; and push the generated event alerts to the one of the client devices via the selected user agent.

* * * * *